Patented Sept. 2, 1930

1,774,932

UNITED STATES PATENT OFFICE

JULIUS LAUX, OF UERDINGEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PRODUCTION OF IRON-OXIDE PIGMENTS

No Drawing. Original application filed September 7, 1926, Serial No. 134,123, and in Germany August 20, 1925. Divided and this application filed September 8, 1927. Serial No. 218,354.

The present invention relates to processes for the production of iron oxide pigments; more specifically, the invention relates to a process in which a finely divided iron hydroxide is obtained as a by-product from the reduction of aromatic nitro compounds by means of iron and acids or acid reacting salts. The invention also embraces the new products.

In the methods of producing aromatic amines heretofore known and used for a long time, involving the use of iron and an amount of acid insufficient to dissolve the same, the iron which is used as the reducing agent generally changes into a brown-black oxide whose composition corresponds to a formula which lies between $Fe_3O_4$ and $Fe_2O_3$. This oxide is not useful as a color pigment and is of very inferior quality on account of its low coloring power.

As I have set forth in my co-pending application for U. S. patent, Serial Number 106,969, filed on May 5, 1926, finely divided iron oxides or iron hydroxides of high commercial value are obtained, if the reduction is carried out under such conditions that the aqueous phase of the reaction mixture is a highly concentrated salt solution.

I have found further, that if the salt present in the solution contains aluminium as metallic base, solutions of lower concentration, and even highly diluted solutions, likewise give good results.

According to the present invention the reduction of aromatic nitro compounds with iron metal is carried out in the presence of a dilute aqueous solution of an aluminium salt. A ready made solution of such a salt may be employed, to which a further addition of acid may be unnecessary on account of the known hydrolysis of aluminium salts leading to the production of sufficient free acid for the reduction. The aluminium salt may, however, also be produced during the reaction, i. e., by the addition to the required quantity of iron of a certain quantity of metallic aluminium. For the purpose of this invention aluminium chloride has been found to be a particularly suitable salt.

If the reduction is carried out in this manner in the presence of a diluted aluminium salt solution (the process not essentially departing in other respects from the customary processes, as will be evidenced by the examples hereinafter set forth) there remains, after the separation of the aromatic amine, for example, aniline, resulting from the nitro compound, a slurry which contains the oxidized iron as a finely divided yellow hydroxide of the trivalent iron oxide $Fe_2O_3$. After levigation, washing out and drying, this hydroxide is useful as a color pigment either directly or, if red shades are desired, after being subjected to a preliminary calcination.

The process is illustrated by the following examples. It is to be understood, however, that the process according to the present invention is capable of being carried out with other nitro compounds than those mentioned in these examples; for example, with chlor-, hydroxy-, and amino-nitro compounds, polynitro compounds and nitrosulfonic acids. Other aluminium salts can be used in place of the chloride. Besides the aluminium salt the solutons may contain other soluble salts in low concentration.

*Example 1.*—200 kgs. of nitrobenzene are allowed to run at 100° C., into 250 kgs. of a 3% solution of aluminium chloride ($AlCl_3$) and 200 kgs. of ground iron. The temperature maintains itself at 100° C. due to the heat of reaction. When the reduction is finished the resulting aniline is separated in the well-known manner. There remains a yellowish brown slurry, which is separated from the excess of metallic iron and dried. It consists of an iron hydroxide having an average content of 12% of combined water. By calcination it is converted into a deep violet-red iron oxide pigment.

*Example 2.*—200 kgs. of ortho-nitrotoluene are reduced in a solution of 18 kgs. of aluminium chloride in 310 kgs. of water with 200 kgs. of iron. After distillation of the ortho-toluidine produced, a yellow hydroxide of iron having a water content of about 12% is obtained from the residues which product, on heating to 500° C., yields a brilliant red iron oxide pigment of high coloring power.

*Example 3.*—200 kgs. of nitronaphthalene are reduced in a solution of 20 kgs. of aluminium chloride, 400 kgs. of water and 10 kgs. of hydrochloric acid (sp. gr. 1.16) with 200 kgs. of iron. When the reduction is completed the naphthylamine produced is extracted by means of solvents. The remaining yellow residues are freed from any remaining solvents by treatment with steam, then washed and centrifuged. By calcination a brilliant red iron oxide is obtained.

*Example 4.*—200 kgs. of nitrobenzene are reduced in 400 kgs. of a 7.5% aqueous solution of hydrochloric acid by means of 220 kgs. of iron and 6 kgs. of aluminium metal. In the course of the reaction aluminium chloride is formed. The iron hydroxide which is obtained as a by-product of the reduction has nearly the same properties as in the foregoing example. The quantity and concentration of the hydrochloric acid used may be varied within wide limits; e. g. less than the amount equivalent to the aluminium metal can be used.

This application is a division of my copending application Ser. No. 134,123, filed Sept. 7, 1926.

I claim:—

1. In the process of reducing an aromatic nitro compound involving the treatment of the nitro compound with a reducing agent comprising iron and an agent which is hydrolyzable in water to produce hydrogen ions, to the production of the corresponding amine and an iron oxide sludge, the steps for improving the pigmenting properties of the said iron oxide sludge which consists in using as the reducing agent a mixture if iron, a dilute aqueous solution of a salt containing aluminum as metallic base and an acid in amount insufficient to dissolve the iron, separating the resulting iron oxide sludge from the reaction mixture, and purifying the former by levigation and washing out.

2. In the process of reducing an aromatic nitro compound involving the treatment of the nitro compound with a reducing agent comprising iron and an agent which is hydrolyzable in water to produce hydrogen ions, to the production of the corresponding amine and an iron oxide sludge, the steps for improving the pigmenting properties of the said iron oxide sludge which consists in using as the reducing agent a mixture of iron, a dilute aqueous solution of a salt containing aluminum as metallic base and an acid in amount insufficient to dissolve the iron, separating the resulting iron oxide sludge from the reaction mixture, purifying the former by levigation and washing out, and drying and calcining the resulting product.

3. In the process of reducing an aromatic nitro compound involving the treatment of the nitro compound with a reducing agent comprising iron and an agent which is hydrolyzable in water to produce hydrogen ions, to the production of the corresponding amine and an iron oxide sludge, the steps for improving the pigmenting properties of the said iron oxide sludge which consist in using as the reducing agent a mixture of iron, a dilute aqueous solution of aluminum chloride and hydrochloric acid in amount insufficient to dissolve the iron, separating the resulting iron oxide sludge from the reaction mixture, and purifying the former by levigation and washing out.

4. In the process of reducing an aromatic nitro compound involving the treatment of the nitro compound with a reducing agent comprising iron and an agent which is hydrolyzable in water to produce hydrogen ions, to the production of the corresponding amine and an iron oxide sludge, the steps for improving the pigmenting properties of the said iron oxide sludge which consist in using as the reducing agent a mixture of iron, a dilute aqueous solution of aluminum chloride and hydrochloric acid in amount insufficient to dissolve the iron, separating the resulting iron oxide sludge from the reaction mixture, purifying the former by levigation and washing out, and dry and calcining the resulting product.

In testimony whereof I have hereunto set my hand.

JULIUS LAUX.